(12) United States Patent
Wada (10) Patent No.: US 6,499,865 B1
(45) Date of Patent: Dec. 31, 2002

(54) SURFACE LIGHT SOURCE DEVICE AND FILM SCANNING APPARATUS

(75) Inventor: Shigeru Wada, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/410,629

(22) Filed: Oct. 4, 1999

(30) Foreign Application Priority Data

Oct. 6, 1998 (JP) ............................................ 10-283917

(51) Int. Cl.[7] ................................................ F21V 33/00
(52) U.S. Cl. .......................................... 362/307; 362/30
(58) Field of Search ............................. 362/31, 29, 30, 362/97, 245, 246, 307, 328, 330, 800; 358/509

(56) References Cited

U.S. PATENT DOCUMENTS

| | | | | |
|---|---|---|---|---|
| 3,832,541 A | * | 8/1974 | Bassett et al. | 362/333 |
| 4,330,813 A | * | 5/1982 | Deutsch | 362/97 |
| 4,453,200 A | * | 6/1984 | Trcka et al. | 362/29 |
| 5,064,276 A | * | 11/1991 | Endo et al. | 362/31 |

FOREIGN PATENT DOCUMENTS

| JP | 09146089 | 6/1997 |
|---|---|---|
| JP | 09033923 | 7/1997 |

* cited by examiner

Primary Examiner—Y. My Quach-Lee
(74) Attorney, Agent, or Firm—McDermott, Will & Emery (57) ABSTRACT

Disclosed is a surface light source device suitable for backlighting film images in film scanner. The surface light source device comprises: a light source for emitting a light toward an optical path; a first reflector provided so that a reflective surface of said first reflector is vertical to the optical path; a second reflector provided between said light source and said first reflector so that a reflective surface of said second reflector is parallel to the optical path; an exit diffusing plate; and a plate on which a diffusing patter is provided, said plate being provided so as to be tilted with respect to the optical path in a direction such that light from the light source is reflected toward the second reflecting surface.

15 Claims, 9 Drawing Sheets

SURFACE LIGHT SOURCE DEVICE AND FILM SCANNING APPARATUS

This application is based on Japanese patent application No. 10-283917 filed on Oct. 6, 1998, the content of which is hereby incorporated by reference.

BACKGROUND OF THE INVENTION

1. Field of the Invention

The present invention relates to a surface light source device and a film scanner using the same.

2. Description of the Related Art

Conventionally, surface light source devices have been used as backlights of flat-panel displays typified by liquid crystal displays and signboards and as devices for backlighting film images in film scanners for reading film images.

Figure 8:
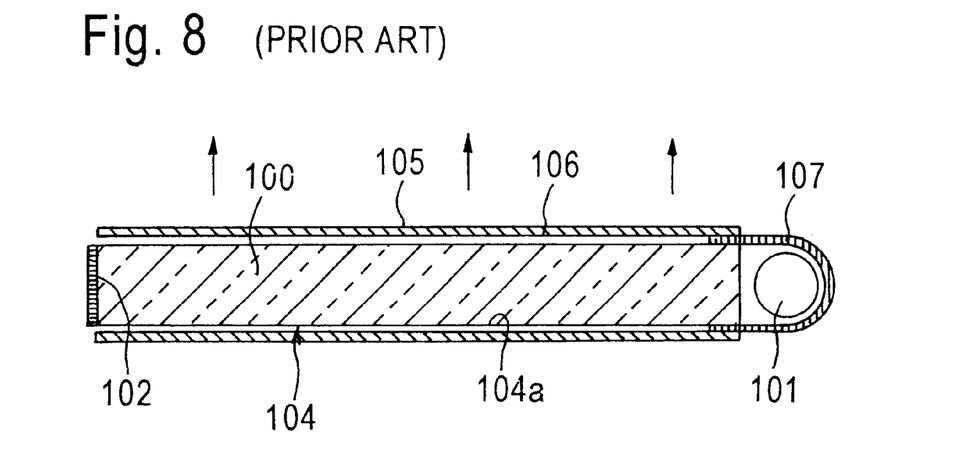
FIG. 8 is a cross-sectional view showing an example of conventional surface light source devices.
Figure 9:
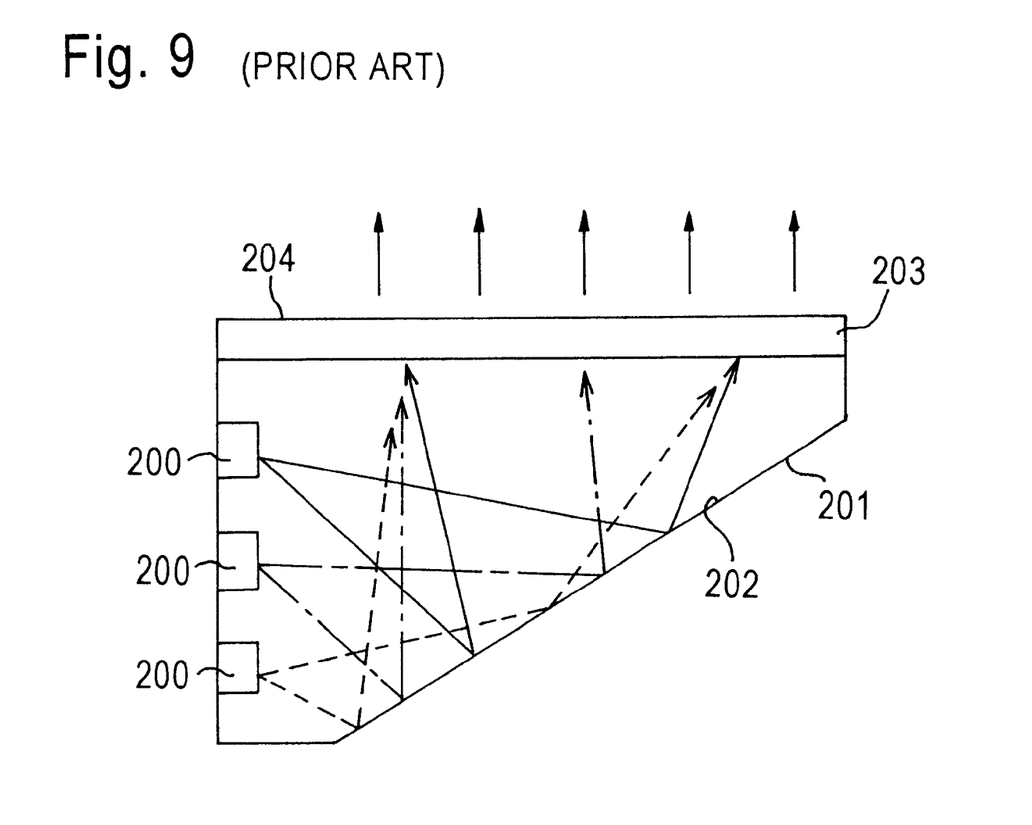
FIG. 9 is a cross-sectional view showing another example of conventional surface light source devices.

Japanese Unexamined Laid-open Patent Application No. 09-33923 discloses a surface light source device for backlighting. Referring to FIG. 8, this surface light source device comprises a light directing plate 100, a radiation light source 101 and a reflector 107. The radiation light source 101 is tubular, and disposed at a side of the light directing plate 100. Light from the radiation light source 101 is incident on the light directing plate 100 directly and after reflected at the reflector 107. The incident light and the light reflected at a reflecting surface 102 provided on an incidence opposite surface of the light directing plate 100 are diffused by a diffusing pattern 104a provided on an exit opposite reflecting surface 104 and a diffusing plate 106 provided on an exit surface 105. Consequently, the light from the radiation light source 101 is directed to the exit surface 105 without any nonuniformness. color surface light source device for backlighting. Referring to FIG. 9, in this color surface light source device, light from LEDs 200 is made incident from a side of a box 201, and after reflected at a reflecting plate 202 in the box 201, the light is made to impinge on a diffusing plate 203 so as to be diffused. Consequently, the light from the LEDs 200 exits from an exit surface 204 without any nonuniformness.

In the conventional example shown in FIG. 8, however, since the reflector 107 and the light directing plate 100 are used to effectively use the light from the radiation light source 101, the structure is complicated and the cost is high. Moreover, when a fluorescent tube is used as the radiation light source 101, it is necessary to increase the operating voltage to approximately 24 V. Further, when a fluorescent tube is used, an inverter circuit is necessary to suppress illumination flicker. For illuminating small areas such as film images, this device is unsuitable because the cost is too high. In addition, the running cost is high. When a xenon tube is used instead of a fluorescent tube, since it is necessary to accumulate charges in a capacitor by increasing the voltage like in the case of a fluorescent tube, the cost is somewhat high although it is not as high as that in the case of a fluorescent tube. Moreover, since it is impossible for this light source device to be always on, it is necessary to control the timing of taking in charges. Since fluorescent tubes and xenon tubes are still thick, they are unsuitable for size reduction, particularly, thickness reduction of surface light source devices.

In the conventional example shown in FIG. 9, since the light from the LEDs 200 is bent only once and is diffused only once, it is necessary for the optical path to be long in order to obtain uniform plane light. Thus, this light source device is also unsuitable for size reduction.

On the other hand, a white LED was recently invented and is attracting attention as a lighting source. This lighting source whose working voltage is approximately 4 V is excellent in energy conversion efficiency and never breaks down.

Therefore, the inventors prototyped a surface light source device using this lighting source. However, the light emission quantity is limited, and in the system shown in FIG. 9 in which the LEDs having high diffusibility is used and the light is made incident from a side of the light directing plate, a sufficient light quantity cannot be obtained. Consequently, to obtain a necessary quantity of plane light, it is necessary to provide LEDs all over a necessary area, so that the cost increases.

SUMMARY OF THE INVENTION

An object of the present invention is to provide a small-size, low-cost surface light source device with which a sufficient quantity of uniform plane light is obtained, and a film scanner using the same.

Another object of the present invention is to provide a surface light source device with which a sufficient quantity of plane light is obtained even when a low-illumination light source is used, and a film scanner using the same.

To achieve at least one of the above-mentioned objects, a surface light source device of the present invention essentially comprises a plate optically disposed between a light source and a light exit surface, said plate being capable of partly passing a light therethrough and of partly diffusing the light. The plate is preferably provided so as to be inclined against at least one of the light source, the light exiting surface and a reflecting surface for reflecting the light.

For example, the surface light source device of the present invention is specifically provided with: a light source; a first reflecting surface which is provided so as to be vertical to an optical path from the light source; a second reflecting surface which is provided between the light source and the first reflecting surface so as to be parallel to the optical path; an exit diffusing plate; and a transparent thin plate tilted or inclined with respect to the optical path in a direction such that light from the light source is reflected toward the second reflecting surface, and where a diffusing pattern is provided.

According to this specific structure, the light from the light source is partly transmitted by the transparent thin plate disposed on the optical path thereof at transparent parts where there is no diffusing pattern, and reaches the first reflecting surface serving as an exit opposite surface to be reflected toward an incidence surface. However, the ratio of the light from the light source directly reaching the first reflecting surface is halved because of the light interrupted by the diffusing pattern of the transparent thin plate and the light reflected by the transparent thin plate toward the second reflecting surface. Since the light reaching the first reflecting surface to be reflected toward the incidence surface again reaches the transparent thin plate, the ratio of the light directly passing through toward the incidence surface is further halved because of the light similarly interrupted by the diffusing pattern and the light surface-reflected at the transparent thin plate toward the exit surface. Consequently, the effectiveness of light improves even when there is no reflecting surface on the side of the incidence surface, and a sufficient quantity of exit light is obtained even when the LED is used as the light source, so that characteristics of the LED are delivered that the life is long and that the device cost and the running cost are both reduced. Further, the light from the light source is diffused by the diffusing pattern of the transparent thin plate three or more times including when the light reaches the transparent thin plate for the first time, when the light is transmitted by the transparent thin plate toward the first reflecting surface to be reflected at the first reflecting surface and again reaches the transparent thin plate, and when the light from the light source reaches the transparent thin plate for the first time to be reflected toward the second reflecting surface and the reflected light is then reflected at the second reflecting surface to again reach the transparent thin plate, and the light is further diffused by the exit diffusing plate when exiting from the exit surface, so that the diffusibility of the exiting light is high. Consequently, uniform plane light is obtained although of the LEDs, one that easily effectively uses light and has an excellent directivity is used as the light source. Therefore, the light diffused by the transparent thin plate is directed in all directions, and although some of the light exits outside from the incidence surface, this hardly affects the quantity of exit light because the ratio of the light exiting outside is low and the remaining light reaches the exit surface. Moreover, since the optical axis of the light source is parallel to the exit surface, the size in the direction of the thickness as the surface light source device like in the case in which the light source is tilted is small, and since the transparent thin plate having a diffusing pattern is only obliquely disposed instead of a light directing plate, the size is small and the cost is low. Therefore, this structure is suitable for illuminating small areas such as film images. In addition, weight reduction is achieved.

The number of light sources may be one. However, according to the size of the area to be illuminated, a plurality of light sources such as LEDs may be disposed parallel to the exit surface.

When the light source, the first reflecting surface, the second reflecting surface, the exit diffusing plate and the transparent thin plate are held in one holder, the structure is simple, the positioning among the elements is easy and the surface light source device is convenient for use as a unit to be replaced.

Moreover, according to the present invention, to construct a film scanner for sensing film images illuminated from behind by a surface light source, the surface light source for performing the above-mentioned illumination is disposed in the rear of the film. Film images can highly precisely be read out with a sufficient quantity of uniform plane light capitalizing on the characteristics of the above-described surface light source device, and further, the overall size is small, the cost is low and the weight is light, and one in which LEDs are used as the light source and a plurality of LEDs are arranged in a direction parallel to the exit diffusing plate is suitable for the above-mentioned reasons.

Other objects and features of the present invention will become apparent from the following detailed description and drawings. The features of the present invention can be used independently or in various combinations to the greatest extent practicable.

These and other objects, advantages and features of the invention will become apparent from the following description thereof taken in conjunction with the accompanying drawings which illustrates a specific embodiment of the invention.

DETAILED DESCRIPTION OF THE PREFERRED EMBODIMENTS

Hereinafter, a surface light source device of the present invention and a film scanner using the same will be described with reference to the drawings.

Before describing the structure of a best mode of the present invention, two kinds of structures prototyped before the best model was arrived at will be described with reference to FIGS. 1(a) and 1(b).

Figure 1A:
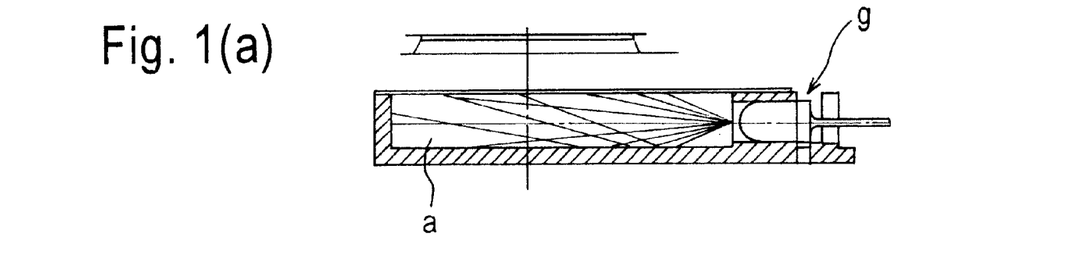
FIGS. 1(a) and 1(b) are cross-sectional views showing the structures of prototypes of a surface light source device of the present invention.

FIG. 1(a) shows the structure of a surface light source device using as the light source at least one white LED 1a having a lens function. By using an LED 1a having a lens function, a high light utilization factor is obtained, and by ingeniously using the whole of the LED 1a, a light quantity sufficient for backlighting small areas is obtained. However, since the directivity is too strong, only by using a rectangular light directing plate in the above-described manner as shown in FIG. 1(a), the light reflected at the incidence opposite surface again exits outside from the incidence surface, so that the light utilization efficiency significantly decreases. The cause of the above-mentioned problem is that, although this problem can be handled by providing in the portion of the LED 1a a reflecting plate that inwardly reflects the light trying to exit outside, no reflecting plate is provided in order to draw out the leads of the LED g.

Figure 1B:
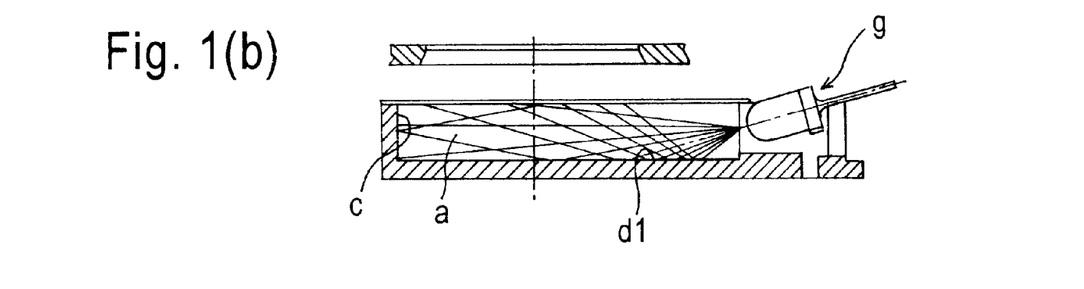

To prevent this, by tilting or inclining the LED 1a as shown in FIG. 1(b) so that the axial light of the LED 1a is reflected at the exit opposite surface to reach the vicinity of the edge on the side of the incidence opposite surface of the exit surface, the quantity of the light reflected at the incidence opposite surface to return to the incidence surface is significantly reduced, so that the light utilization factor can be increased. However, the placement height viewed in the direction in which the light from the LED 1a exits is large, so that the thickness is large for the thickness of a surface light source device. To avoid this, a wedge-shaped light directing plate is used, and most or all of the light from the LED 1a is reflected at the exit opposite surface oblique to the light directing plate and directed to the exit surface directly or after reflected at the incidence opposite surface. However, since the shape of the light directing plate is odd, manufacturing this increases the cost.

Figure 1C:
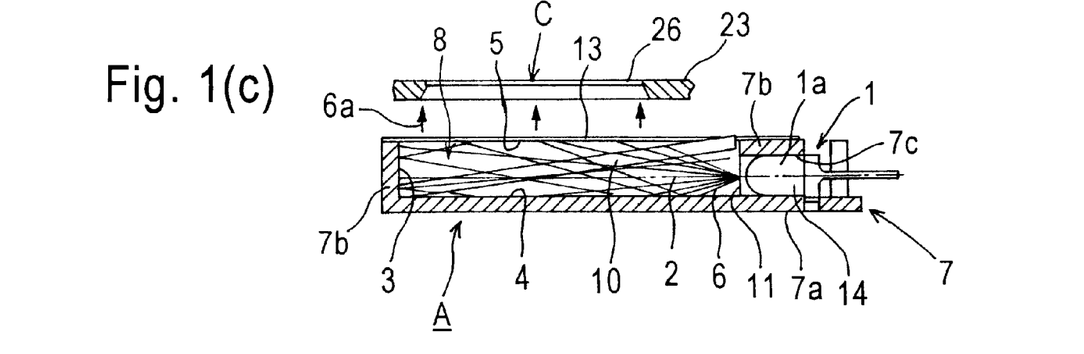
FIG. 1(c) is a cross-sectional view showing a best mode of the surface light source device of the present invention.
Figure 2:
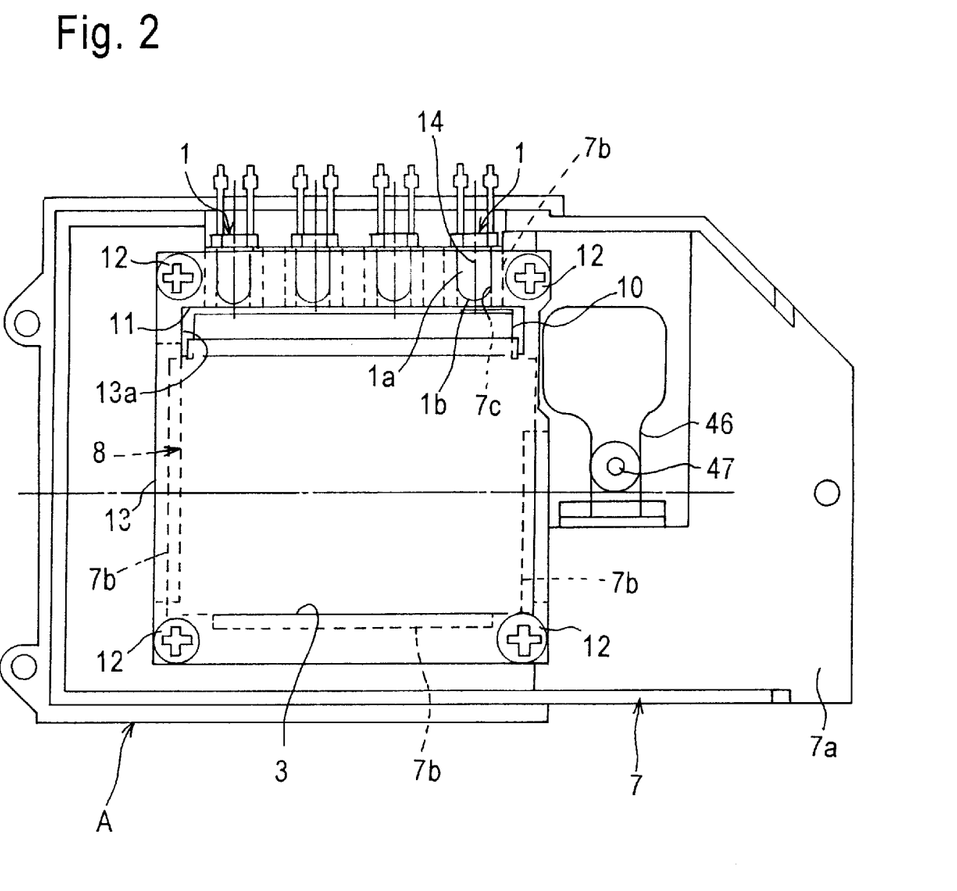
FIG. 2 is a front view of the surface light source device of FIG. 1(c)

Based on the above, the best mode of the present invention will be described. A surface light source device A of this embodiment shown in FIGS. 1(c) and 2 is an example of a surface light source device used in a film scanner B shown in FIGS. 3 to 6. However, the present invention is not limited thereto but is effective for application as backup lights for various uses such as for various displays and visual recognition such as liquid crystal displays, light transmitting signboards and light transmitting images.

As shown in FIGS. 1(c) and 2, the surface light source device A of this embodiment has a light source 1, a first reflecting surface 3, a second reflecting surface 4, an exit diffusing plate 5 and a transparent thin plate 10. In this embodiment, these elements are held in a holder 7. The first reflecting surface 3 is disposed on the optical path from the light source so as to be vertical to the optical path 2. The second reflecting surface 4 is disposed between the light source 1 and the first reflecting surface 3 so as to be parallel to the optical path 2. The transparent thin plate 10 where a diffusing pattern is provided is disposed so as to be tilted with respect to the optical path 2 in a direction such that light 6 from the light source 2 is reflected toward the second reflecting surface 4.

Figure 1D:
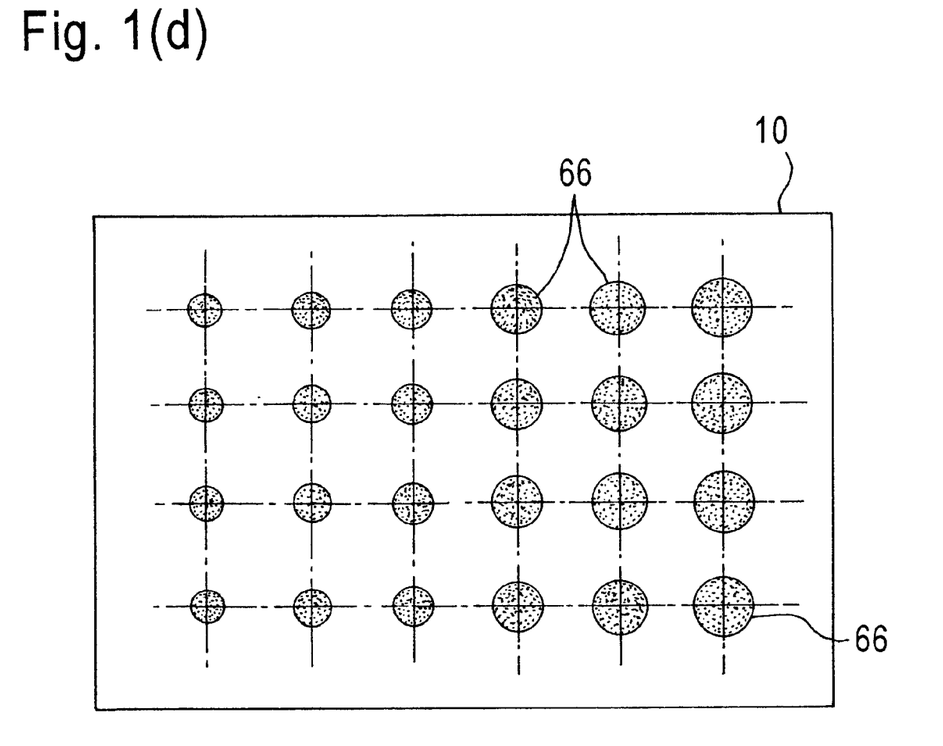
FIG. 1(d) is diagram showing the transparent thin plate 10 of FIG. 1(c).

FIG. 1(d) shows an example of transparent thin plate 10, which is the same as the plate shown in FIG. 3 of U.S. Pat. No. 5,521,797. FIG. 1(d) shows transparent thin plate 10 having a pattern of circle-dots 66 of light scattering/diffusing areas on a light conducting plate.

The material of the holder 7 is, for example, synthetic resin although not specifically limited, and predetermined configuration and structure are obtained by one-piece molding. The holder 7 has a size, a configuration and a structure suitable for mounting in the film scanner B. In the holder 7, ribs 7b of four sides on the upper, lower, left and right disposed substantially in a square so as to surround an illumination area 8 are formed by one-piece molding in a position to one end of a flat and rectangular holding wall 7a in the direction of the length. Appropriate spaces are provided between the ribs 7b of the four sides. In the rib 7b of the upper side which is thicker than the other ribs 7b, a plurality of holes 7c into which LEDs 1a serving as the light source 1 are press-fit are formed in correspondence with the size in the vertical direction which is in the direction of the length of the illumination area 8. In the illustrated embodiment, four holes 7c are provided.

On the ends of the ribs 7b of the four sides protruding from the holding wall 7a, a diffusing sheet serving as the exit diffusing plate 5 is provided so as to spread thereover. The diffusing sheet is screwed to the holding wall 7 at its four corners with screws 12. This screwing may be performed to the ribs 7b. Into each of the holes 7c of the rib 7b of the upper side, the LED 1a is press-fit from above in FIG. 2 with a light emitting end 1b downward so that the optical path 2 from the LED 1a is directed toward the rib 7b of the lower side.

By adopting the attachment by press fitting, no special member (for example, adhesive) is required for fixing the LED 1a. Further, the adoption of this attachment method produces an advantage that positioning can be performed by fitting the LEDs 1a into the holes 7c. The inner surface of the rib 7b of the lower side forms the first reflecting surface 3 perpendicular to the optical path 2. The inner surfaces of the ribs 7b of the left and right sides form the second reflecting surface 4 parallel to the optical path 2. An exit surface 13 formed by the surface of the exit diffusing plate 5 is parallel to the optical path 2. The optical path 2 is sandwiched between the exit surface and the second reflecting surface 4.

The transparent thin plate 10 comprises a plate of acrylic resin or glass where a diffusing pattern is formed by printing or surface treatment. The diffusing pattern of the transparent thin plate 10 may be formed so that studded transparent parts are left or so as to be studded in a transparent part. To sum up, by forming various paths of light in various directions and mixing the optical paths together, uniform plane light is obtained. In this sense, the transparent thin plate 10 may be one that has only a portion reflecting light on its one or both surfaces.

In view of the use of this embodiment that the film scanner B reads film images, a white LED is suitable as the LED 1a. However, when the use is different, an LED of a color suitable for the use is used. In view of effectively using light, it is appropriate to use as the LED 1a an LED having a directivity due to a lens function. The exit diffusing plate 5 has a window 13a in a part other than the effective area on the side of the light source 1 (that is, the upper end side in FIG. 2). An end of the transparent thin plate 10 fronts outside through the window 13a. With this structure, the thickness of the holder 7 that is necessary for tilting or inclining the transparent thin plate 10 can be reduced, so that the thickness of the surface light source device A can be reduced to an extent that hardly exceeds the size of the LED 1a.

In FIG. 1(c), the light 6 from the light source 1 is partly transmitted by the transparent thin plate 10 disposed on the optical path 2 thereof at the transparent parts where there is no diffusing pattern, and reaches the first reflecting surface 3 serving as the exit opposite surface to be reflected toward an incidence surface 11. However, the ratio of the light from the light source I directly reaching the first reflecting surface 3 is halved because of the light interrupted by the diffusing pattern of the transparent thin plate 10 and the light surface-reflected by the transparent thin plate 10 toward the second reflecting surface 4. Since the light reaching the first reflecting surface 3 to be reflected toward the incidence surface 11 again reaches the transparent thin plate 10, the ratio of the light directly passing through the transparent thin plate 10 at the transparent parts toward the incidence surface 11 is further reduced because of the light interrupted by the diffusing pattern and the light surface-reflected at the transparent thin plate 10 toward the exit surface 13. Consequently, the effectiveness of the light 6 improves even when there is no reflecting surface on the side of the incidence surface 11. A sufficient quantity of exit light is obtained even when the LEDs 1a are used as the light source. In addition, a characteristic of the LED that the device cost and the running cost are both reduced is delivered.

Further, the light 6 from the light source 1 is diffused at least three times by the diffusing pattern of the diffusing pattern 10 of the transparent thin plate 10. That is, the light 6 is diffused at least three times including 1) when the light 6 from the light source 1 reaches the transparent thin plate 10 for the first time, 2) when the light 6 is transmitted by the transparent thin plate 10 toward the first reflecting surface 3 to be reflected at the first reflecting surface 3 and the reflected light again reaches the transparent thin plate 10, and 3) when the light 6 from the light source 1 reaches the transparent thin plate 10 for the first time to be reflected toward the second reflecting surface 4 and the reflected light is then reflected at the second reflecting surface 4 to again reach the transparent thin plate 10. In addition thereto, the light 6 is further diffused by the exit diffusing plate 5 when exiting from the exit surface 13. Consequently, according to the above-described structure, the image of the diffusing pattern of the transparent thin plate 10 is not seen on the exit surface 13. Further, according to the above-described structure, uniform plane light 6a is obtained although of the LEDs 1a, one that easily effectively uses the light 6 and has an excellent directivity is used as the light source 1 as described above. Therefore, the light diffused by the transparent thin plate 10 is directed in all directions, and although some of the light exits outside from the incidence surface 11, this hardly affects the quantity of exit light because the ratio of the light exiting outside is low and the remaining light reaches the exit surface 13. Moreover, since the optical axis 14 of the light source 1 is parallel to the second reflecting surface 4 and the exit surface 13, the size in the direction of the thickness as the surface light source device A like in the case as shown in FIG. 1(b) in which the light source 1 is tilted is small, and since the transparent thin plate 10 having a diffusing pattern is only obliquely disposed instead of a light directing plate, the size is small and the cost is low. Therefore, this structure is suitable for illuminating small areas such as film images. In addition, weight reduction is achieved.

Basically, the number of light sources 1 may be one. However, according to the size of the area to be illuminated, a plurality of light sources 1 such as the LEDs 1a are disposed parallel to the exit surface 13 as shown in FIGS. 1(c) and 2. Alternately, the illumination area in the direction of the optical path 2 can be doubled by arranging the light sources 1 so as to be plane-symmetrical in the direction of the optical axis 14 for the limit of the range in which the light from one light source 1 spreads in the direction of the optical path 2.

When the surface light source device A comprises the light source 1, the first reflecting surface 3, the second reflecting surface 4, the exit diffusing plate 5 and the transparent thin plate 10 held in one holder 7 as described above, the structure is simple, the positioning among the elements is easy, and the surface light source device A is convenient for use as a unit to be replaced. The film scanner B using the surface light source device A of the above-described structure (see FIGS. 3 to 6) reads out, with image sensing unit 21, film images illuminated from behind by the surface light source device A as the surface light source in an image sensing position C.

Figure 3:
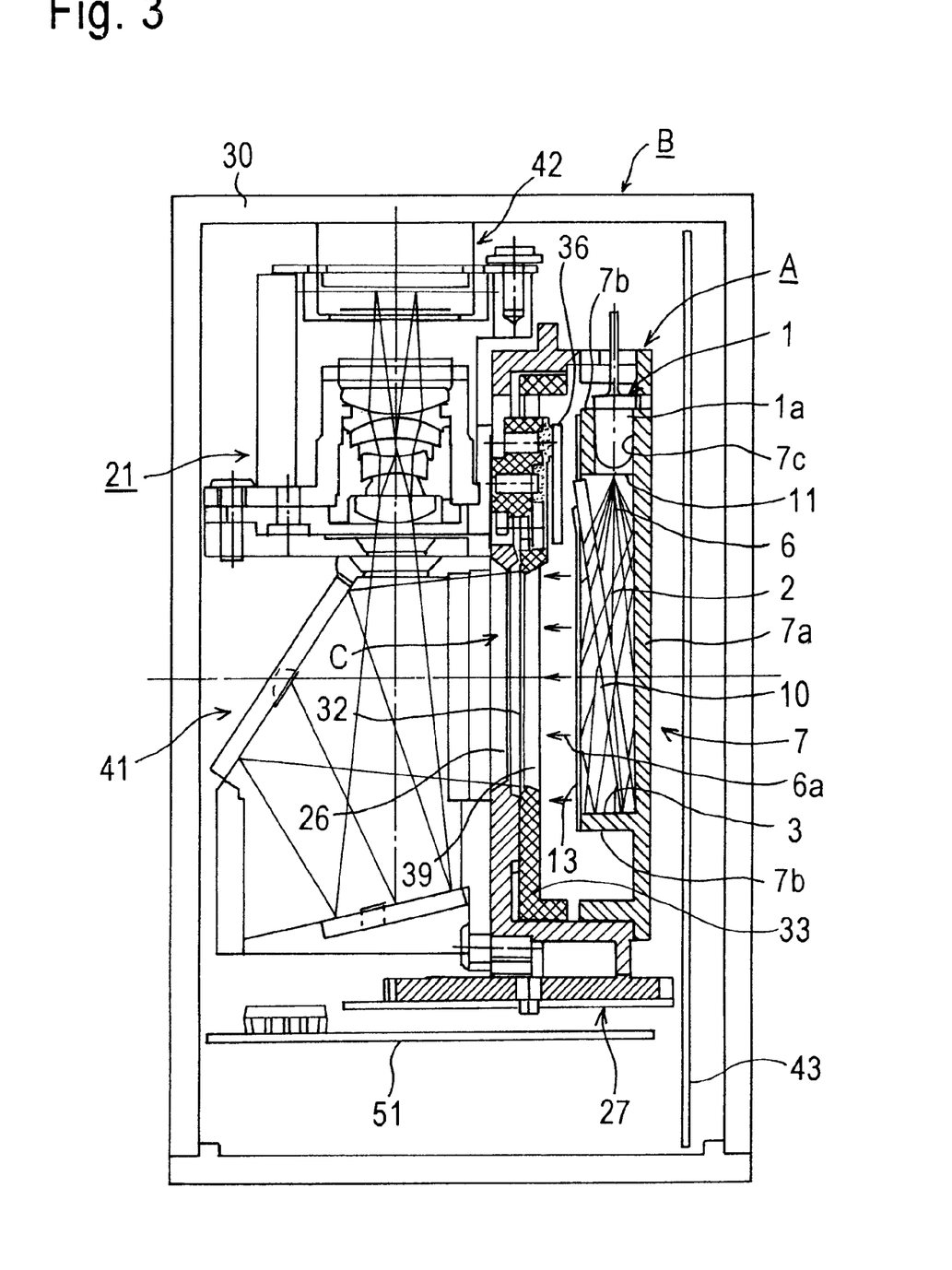
FIG. 3 is a longitudinal cross-sectional view showing an embodiment of a film scanner using the surface light source device of FIG. 1(c)
Figure 4:
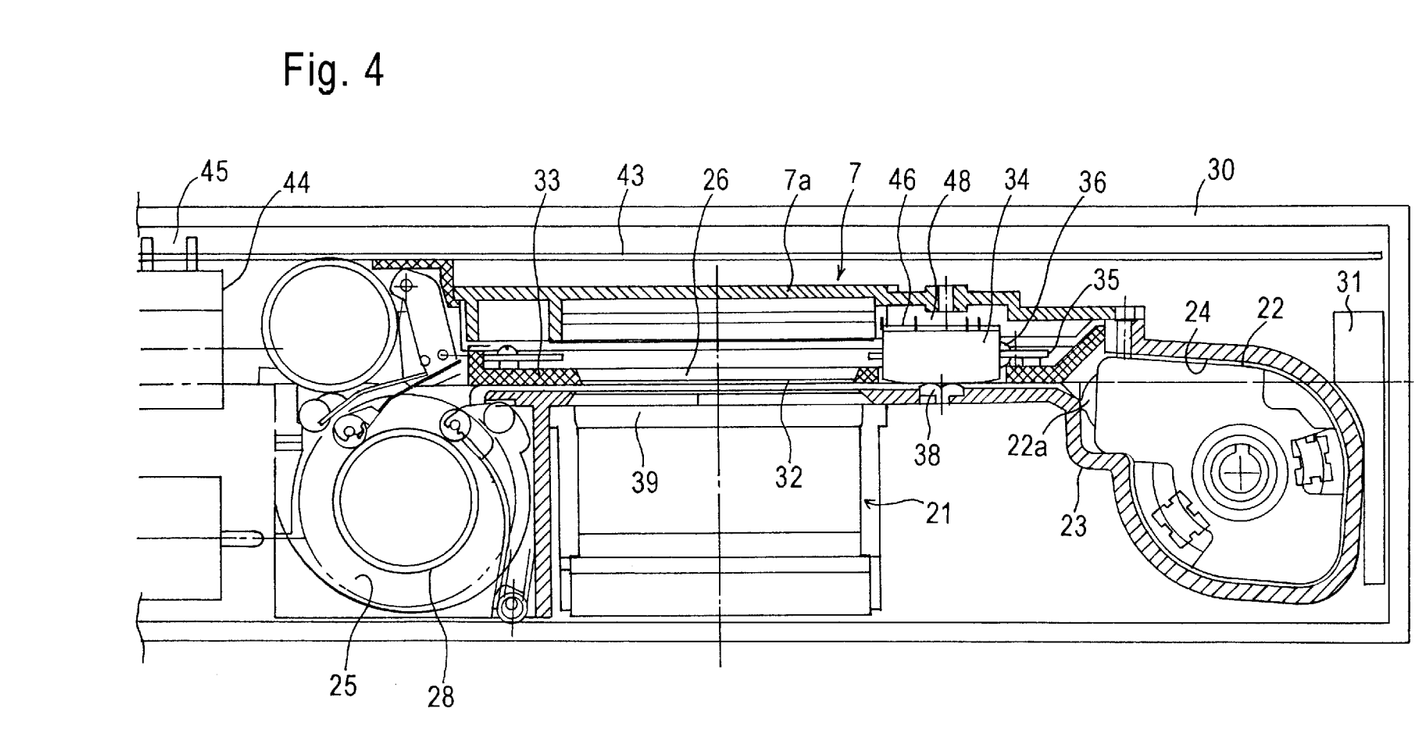
FIG. 4 is a lateral cross-sectional view of the film scanner of FIG. 3.

In the embodiment shown in FIGS. 3 to 6, a film cartridge 22 of the advanced photo system shown in FIG. 4 is set and the images on the film housed in the cartridge 22 are read out. However, the present invention is not limited thereto; different types of film cartridges may be loaded, and not only roll film but sheet film containing one frame or a plurality of frames may be used.

In the embodiment shown in FIGS. 3 to 6, since roll film is used, a cartridge chamber 24 for placing the film cartridge 22 therein is disposed on one of the left and the right sides of the body 23, and a film chamber 25 into which the film drawn out of the film cartridge 22 is wound up is disposed on the other side. In the image sensing position C between the cartridge chamber 24 and the film chamber 25, an aperture 26 for image sensing is disposed. A film transport mechanism 27 for using the film cartridge 22 of the advanced photo system is provided so as to spread over the cartridge chamber 24 and the film chamber 25. The film transport mechanism 27 opens a lid 22a of the film cartridge 22, pushes out the film, sends the film to a film winding up spool 28 in the film chamber 25 so as to be wound up.

Figure 5:
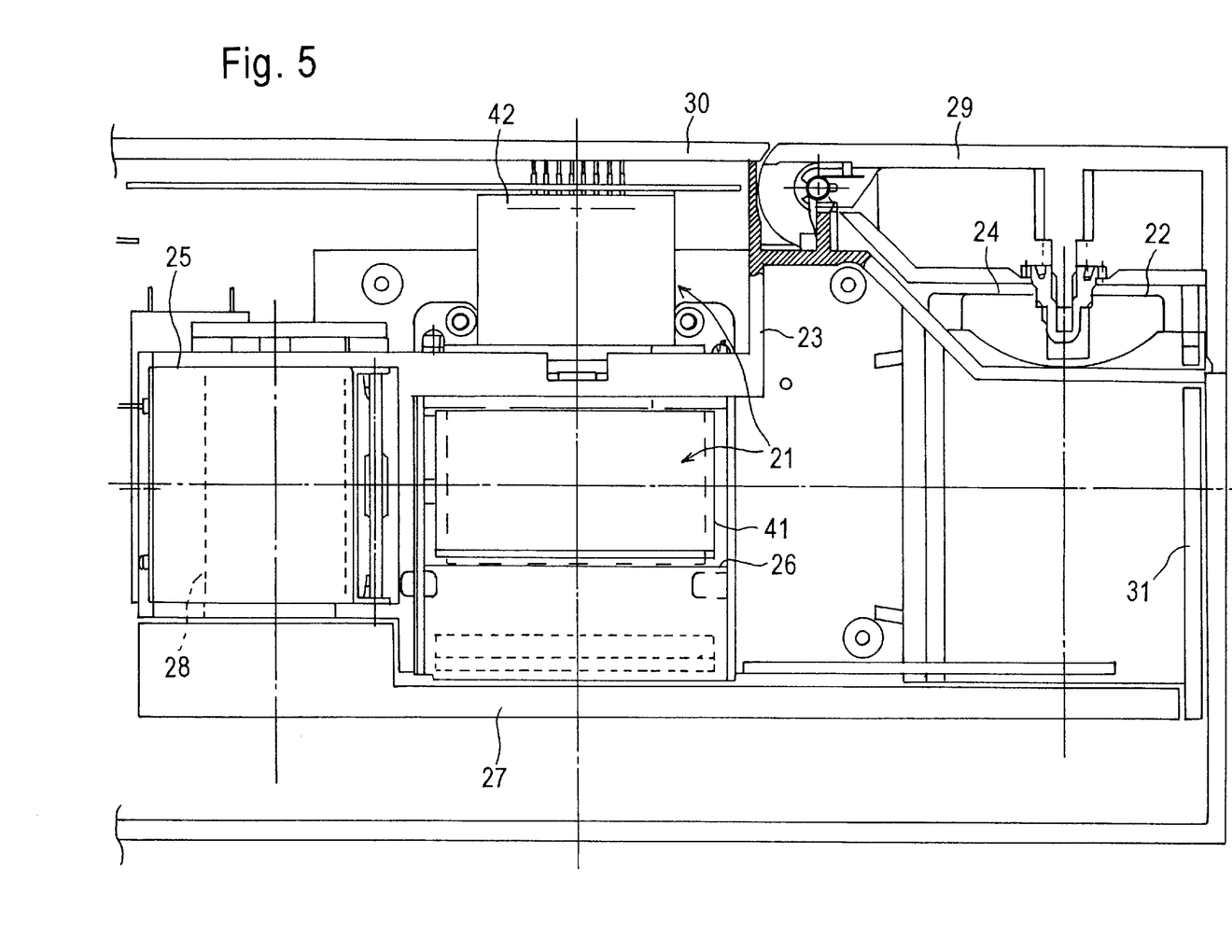
FIG. 5 is a rear view of the film scanner of FIG. 3 from which the exterior case of the body is removed.

After image sensing is finished, the film transport mechanism 27 rewinds the film wound around the film winding up spool 28 into the film cartridge 22, and closes the lid 22a after the film is housed in the film cartridge 22. The cartridge chamber 24 has an ejection mechanism 31 for ejecting the film cartridge 22 when a cover 29 shown in FIG. 5 provided on the exterior case 30 is opened.

To perform the above-described illumination, the surface light source device A is disposed in the rear of the film situated in the image sensing position C. To the surface light source A, the exit surface 13 is opposed with a film transport path 32 in between in the aperture 26 situated in the image sensing position C by screwing the holding wall 7a of the holder 7 to the body 23 as shown in FIG. 4. Between the body 23 and the holding wall 7a, a platen 33 pushed toward the aperture 26 by a spring is disposed so that the film is in close contact with the aperture 26 with excellent flatness.

The platen 33 is provided with a magnetic head 34 for performing writing and reading onto and from the magnetic recording band of the film. The magnetic head 34 is held by a head mount 35. The head mount 35 is floatingly supported by the platen 33 so that it can move in a vertical direction by sliding or rotating with respect to the platen 33, and has a non-illustrated arm slightly entering the film transport path 32 so as to abut the edge of the film transported by being pushed by a follower spring 36, thereby stabilizing the position of the magnetic head 24 with respect to the film. A pressure spring 37 for pressing the magnetic head 34 against the film is caused to act on the head mount 35. In the position of the film transport path 32 where the magnetic head 34 is pressed against the film, a pad 38 for backing up the film from the opposite side is provided on the body 23. On the platen 33, an illumination window 39 for preventing the illumination from the surface light source device A from being interrupted is provided so as to be opposed to the aperture 26.

When the film sent out from the film cartridge 22 comes to the vicinity of the magnetic head 34, the film abuts the arm of the head mount 35 so as to slightly push the arm away, whereby the magnetic head 34 is guided to a film edge reference. The magnetic head 34 abuts the pad 38 until the film comes. However, when the film comes, the magnetic head 34 presses the film against the pad 38. When the film shakes in a direction perpendicular to the film transport direction, that is, in the direction of width of the film, following the shake of the film, the magnetic head 34 is moved in a vertical direction by being pushed by the follower spring 36, and the positioned condition of the film edge reference does not change. When the front end of the film moves out from between the magnetic head 34 and the pad 38 in order for the film to be housed in the film cartridge 22, the magnetic head 34 again abuts the pad 38.

As shown in FIG. 3, the image sensing unit 21 focuses the light transmitted by the film image situated at the position of the aperture 26 being illuminated with uniform plane light from the surface light source device A with an image reading optical system 41 on a reading surface of an image reading portion 42 having a photoelectric conversion characteristic using CCD sensors or the like, converts the light into an electric signal, and stores the electric signal into non-illustrated storage to thereby perform reading. Image reading can be performed with CCD sensors arranged so as to correspond to the entire image focused on the reading surface or by performing scanning with a CCD line sensor. The optical path of the image reading optical system 41 may have any arrangement. However, bending the optical path a plurality of times like in the illustrated embodiment is advantageous in that a conjugate distance necessary for image reading is obtained in a compact area.

In this taking in of film images, search can be made from the contents recorded on the magnetic recording band for the image of each frame of the transported film, and desired images can be taken in a desired order while the film is transported backward and frontward. Signal transmission and reception between parts for the image reading operation by the image sensing unit 21 and the recording and reading operations by the magnetic head 34 is performed through a signal substrate 43 disposed between the surface light source device A and the exterior case 30. Writing and reading by the magnetic head 34 can be performed both when the film is transported and when the film is rewound. For the signal transmission and reception, the signal substrate 43 is connected with a controller 44 by a connector 45 with a necessary number of electric connections, and is connected with the magnetic head 34 by a connecting fillet 46 comprising a flexible substrate, having a thin strip shape and holding a necessary number of connection lines.

Figure 6:
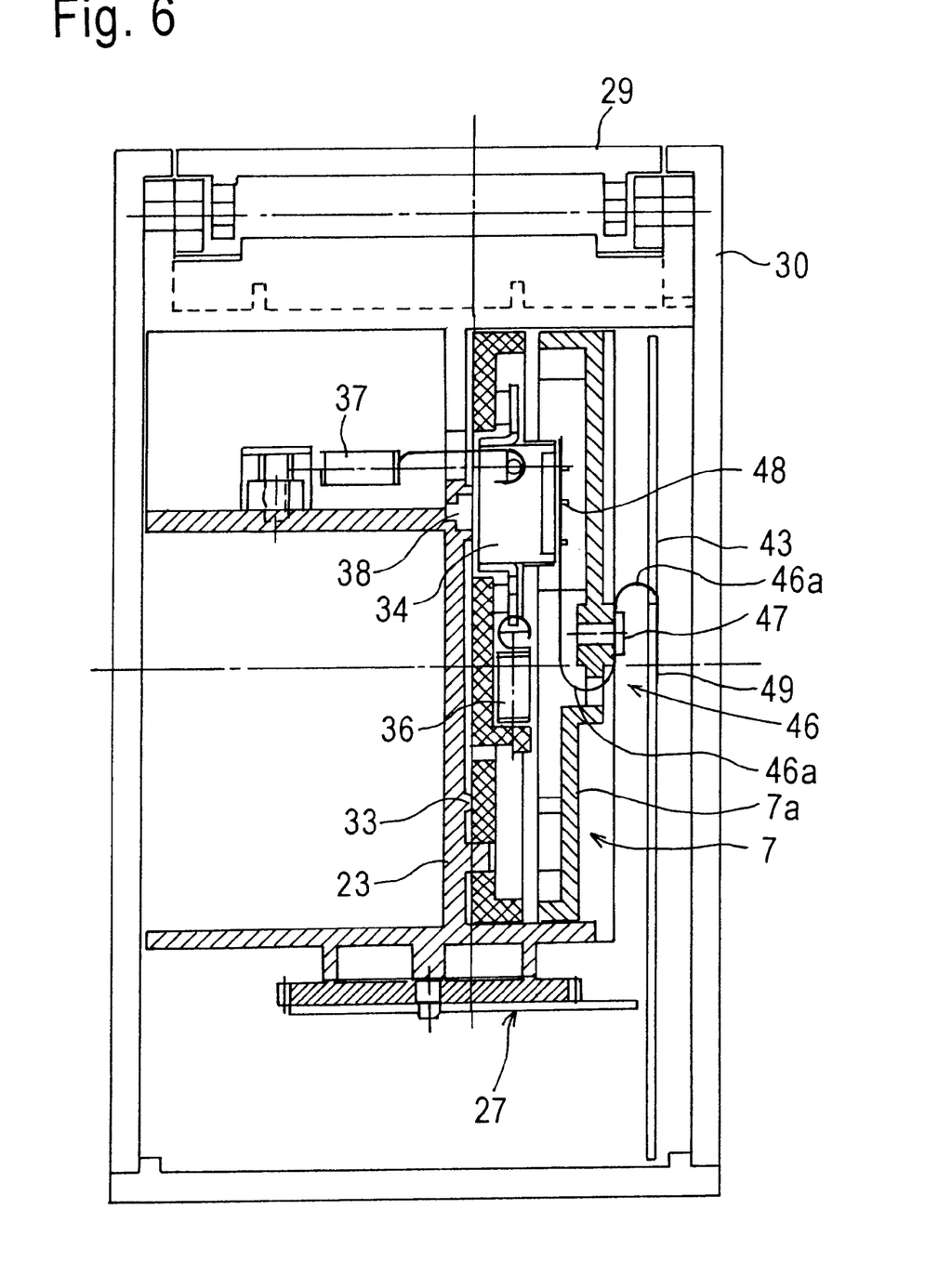
FIG. 6 is a longitudinal cross-sectional view of the film scanner of FIG. 3 viewed from a different position from that of FIG. 3.

As shown in FIG. 6, a central portion of the connection fillet 46 is screwed to the holding wall 7a of the holder 7 with a screw 47. One side of the connection fillet 46 is curled and reversed in direction, and then, the end portion is connected to the magnetic head 34 with a connector 48. The other side of the connection fillet 46 is curled in the direction opposite to the above direction and reversed in direction, and then, the end portion is connected to the signal substrate 43 with solder 49 or the like. The curled portions 46a absorb by the deformation thereof positioning errors and position changes between the magnetic head 34 and the screwed portion and between the screwed portion and the signal substrate 43, whereby the connection fillet 46 can be prevented from being damaged and the connections between the connection fillet 46, and the magnetic head 34 and the signal substrate 43 can be prevented from being broken or damaged.

Figure 7:
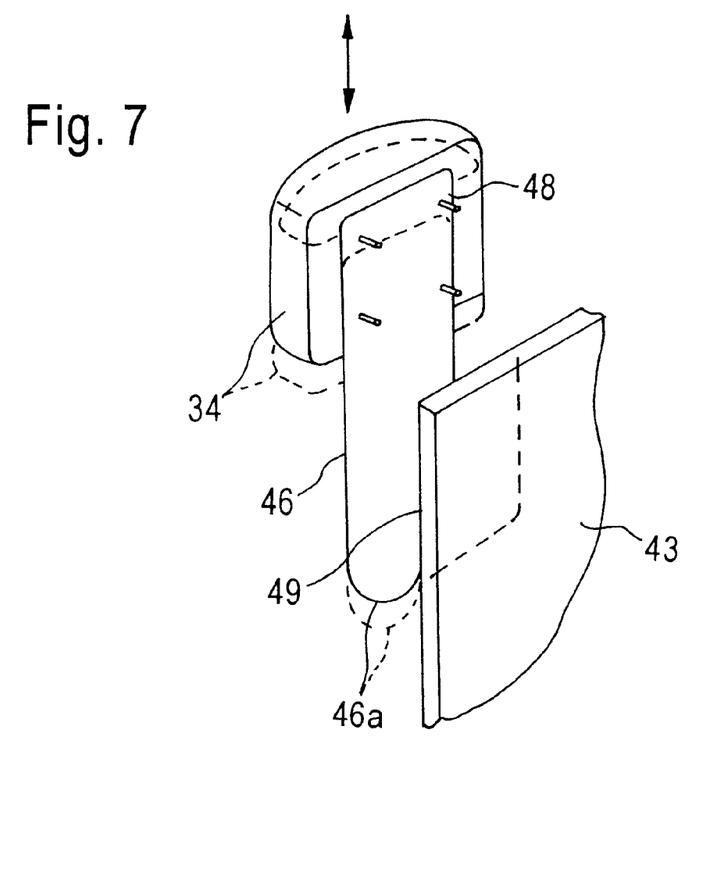
FIG. 7 is a perspective view showing another embodiment of the structure of connection between a magnetic recording head and a signal plate.

The movement absorption by the curled portions 46a is effective particularly at the magnetic head 34 that moves following the film. When the magnetic head 34 and the signal substrate 43 are directly connected as shown in FIG. 7, one curled portion 46a is provided on the connection fillet 46. At the bottom of the exterior case 30, a power source substrate 51 is provided, and one or a plurality of necessary power sources are formed.

According to the above-described embodiment, the ratio of the light from the light source that returns to the incidence surface and exits outside is reduced. Consequently, the effectiveness of light improves even when there is no reflecting surface on the side of the incidence surface, and a sufficient quantity of exit light is obtained even when an LED is used. Further, the ratio of the light from the light source that is repetitively diffused by the diffusing pattern of the transparent thin plate before reaching the exit surface is high, and the light is further diffused by the exit diffusing plate when exiting from the exit surface, so that the diffusibility of the light exiting from the exit surface is high. Consequently, uniform plane light is obtained although of the LEDs, one that easily effectively uses light and has an excellent directivity is used as the light source. Moreover, since the transparent thin plate having a diffusing pattern is only obliquely disposed instead of a light directing plate, the size is small and the cost is low. Therefore, this structure is suitable for illuminating small areas such as film images. In addition, weight reduction is achieved.

According to the film scanner of the above-described embodiment using the above-described surface light source device, film images can highly precisely be read out with a sufficient quantity of uniform plane light capitalizing on the characteristics of the above-described surface light source device. In addition, the overall size is small, the cost is low and the weight is light.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A surface light source device for emitting a two dimensional light from a light exit, said surface light source device comprising:

a light source for emitting a light;

a plate having a surface that has both a transparent portion and a diffusing portion, the transparent portion passing a first portion of the light therethrough and the diffusion portion diffusing a second portion of the light, said plate being optically disposed between said light source and said light exit;

a first reflector which is provided so that light having passed said plate is reflected by a first reflective surface and the light thus reflected is directed toward said plate again; and a second reflector which is provided so that the light having been diffused by said plate is reflected and the light thus reflected is directed toward said plate again.

2. The surface light source device as claimed in claim 1, wherein said plate is disposed so as to be inclined with respect to said second reflector.

3. The surface light source device as claimed in claim 1, wherein said plate is disposed so as to be inclined with respect to said first reflector.

4. The surface light source device as claimed in claim 1, wherein said light source comprises at least one light emitter having a directivity mainly emitting the light in a predetermined direction.

5. The surface light source device as claimed in claim 4, wherein said plate is provided so as to be inclined with respect to the predetermined direction.

6. The surface light source device as claimed in claim 5, wherein said first reflective surface of said first reflector is vertical to the predetermined direction, and so that said plate is located between said light source and said first reflector.

7. The surface light source device as claimed in claim 5, wherein said second reflector is provided so that a reflective surface of said second reflector is parallel to the predetermined direction, and so that said plate is located between said light exit and said second reflector.

8. The surface light source device as claimed in claim 1, further comprising:

a diffusing plate located at the light exit.

9. The surface light source device as claimed in claim 1, wherein said plate is a single tilted plate.

10. A surface light source device comprising:

a light source for emitting a light toward an optical path;

a first reflector provided so that a reflective surface of said first reflector is vertical to the optical path;

a second reflector provided between said light source and said first reflector so that a reflective surface of said second reflector is parallel to the optical path;

an exit diffusing plate; and a plate having a surface that has both a transparent portion and a diffusing portion, said plate being provide so that a surface of the plate that the light from the light source initially strikes is tilted the second reflector such that light from the light source is reflected toward the reflecting surface of the second reflector.

11. The surface light source device as claimed in claim 10, wherein said light source, said first reflector, said second reflector, said exit diffusing plate, and said plate are provided in a holder.

12. The surface light source device as claimed in claim 10, wherein said light source comprises at least one light emitting diode.

13. The surface light source device as claimed in claim 12, wherein said light source comprises a plurality of light emitting diodes aligned in a direction parallel to a surface of said exit diffusing plate.

14. The surface light source device as claimed in claim 10, wherein said plate is a single tilted plate.

15. A surface light source device for emitting a two dimensional light from a light exit, said surface light source device comprising:

a light source for emitting a light;

a plate having a surface that has both a transparent portion and a diffusing portion, the transparent portion passing a first portion of the light therethrough and the diffusion portion diffusing a second portion of the light, said plate being optically disposed between said light source and said light exit; and a first reflector which is provided so that light having passed said plate is reflected by a first reflective surface and the light thus reflected is directed toward said plate again, wherein said plate is disposed so as to be inclined with respect to said first reflector.

\* \* \* \* \*